US007483674B2

(12) United States Patent
Haartsen et al.

(10) Patent No.: US 7,483,674 B2
(45) Date of Patent: Jan. 27, 2009

(54) PROVIDING ROBUSTNESS IN FADING RADIO CHANNELS

(75) Inventors: Jacobus C. Haartsen, Hardenberg (NL); Magnus Hansson, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 485 days.

(21) Appl. No.: 10/929,452

(22) Filed: Aug. 31, 2004

(65) Prior Publication Data

US 2006/0046659 A1 Mar. 2, 2006

(51) Int. Cl.
*H04B 17/00* (2006.01)
(52) U.S. Cl. .................................. 455/67.11; 455/450
(58) Field of Classification Search ................ 455/450, 455/452.1, 452.2, 67.11, 423; 370/329
See application file for complete search history.

(56) References Cited

U.S. PATENT DOCUMENTS

| 6,519,460 | B1 | 2/2003 | Haartsen |
| 2002/0003792 | A1 | 1/2002 | Schmidl et al. |
| 2002/0052201 | A1 | 5/2002 | Wilhelmsson et al. |
| 2004/0017794 | A1 | 1/2004 | Trackewsky |

FOREIGN PATENT DOCUMENTS

WO  WO 02/37692 A2  5/2002
WO  WO 03/021886 A2  3/2003

OTHER PUBLICATIONS

Haartsen, J.C., "The Bluetooth Radio System," *IEEE Personal Communications*, vol. 7, No. 1, Feb. 2002. New York, United States.
Janssen, Gerard J.M. et al., "Wideband Indoor Channel Measurements and BER Analysis of Frequency Selective Multipath Channels at 2.4, 4.75 and 11.5 GHz", *IEEE Transactions on Communications*, vol. 44, No. 10, pp. 1272-1288, Oct. 1996.
Rappaport, T.S. "Wireless Communications, Principles and Practice, $2^{nd}$ Edition," Prentice Hall PTR, New Jersey, United States, ISBN 0-13-042232, 2002.
PCT International Search Report, dated Nov. 24, 2005, in connection with International Application No. PCT/EP2005/009069.
PCT Written Opinion, dated Nov. 24, 2005, in connection with International Application No. PCT/EP2005/009069.

*Primary Examiner*—Quochien B Vuong
(74) *Attorney, Agent, or Firm*—Potomac Patent Group PLLC

(57) ABSTRACT

A carrier frequency is selected to be used to communicate information to a transceiver in a communication system. Selecting includes, on each of one or more carrier frequencies, transmitting a probe message to the transceiver. A frequency offset between any two adjacent ones of the carrier frequencies is at least about 8 MHz. One or more response messages are received from the transceiver, wherein each of the one or more response messages is a response to a received one of the one or more probe messages. The one or more response messages are used to determine which of the one or more carrier frequencies will be used to communicate information to the transceiver. In some embodiments, each of the probe messages includes a training sequence, and information included in the one or more response messages enables selection of one of a number of possible modulation schemes to be used.

32 Claims, 13 Drawing Sheets

300

400

PROVIDING ROBUSTNESS IN FADING RADIO CHANNELS

BACKGROUND

This invention relates generally to communications in which total available spectral bandwidth is larger than that needed for communication and, more particularly, to optimization of communication systems in which communicating devices are allowed to change carriers in order to make use of excess available bandwidth. Furthermore, the invention relates to wireless channels that are impacted by multi-path conditions giving rise to large signal strength variations in the frequency domain.

In wireless communication systems, data to be communicated is typically transmitted in bursts on a carrier whose characteristics may vary over time. In other words, a first burst of data might be transmitted over the carrier while the carrier has very good performance that allows the first burst of data to be received correctly, while, as a second burst of data is transmitted on the carrier, the performance of the carrier might have worsened such that the second burst of data is not received correctly. This problem can be explained by the fact that the channel includes multiple paths between the transmitter and the receiver; therefore, even a small movement by either a transmitter or a receiver can affect whether these multiple paths combine constructively or destructively.

If a rate of change of the performance of a carrier is relatively great in comparison to a data rate on the carrier, the problem of varying carrier performance can be solved using coding and interleaving, in which carrier performance variations are averaged so that the carrier's performance depends on average carrier conditions rather than on worst-case carrier conditions. However, if the carrier's performance varies relatively slowly and/or if the data rate is relatively great, this approach is not feasible because the number of symbols needed in an interleaver is too large. In such situations, an entire packet could be received during a period in which the carrier's performance is poor.

Multi-path phenomena are frequency-selective; therefore, if performance of a first carrier having a first frequency is poor, performance of a second carrier having a second frequency is often better, especially if the second frequency is not too close to the first frequency. The coherence bandwidth is a measure of how far apart the two frequencies must be in order for the two carriers to be uncorrelated.

Reference is now made to FIG. 1, wherein there is shown a graph representing an exemplary channel frequency response 104 of a radio channel measured from 2400 MHz to 2440 MHz. Graph 100 shows frequency in Megahertz (MHz) on an x-axis and on a y-axis, signal strength is plotted in decibels (dB) (i.e., 20 log [abs (H(f))]). It only shows the part from 2400 MHz to 2440 MHz. In practice, the entire unlicensed 2.4 GHz Industrial, Scientific, and Medical (ISM) band from 2400 MHz to 2483.5 MHz is available for radio communication applications. For the sake of clarity, only the lower part is shown here. The spectral representation of the signal is shown as the transmit spectrum 102. As an example in FIG. 1, the transmit spectrum 102 is placed at 2415 MHz. In this area, the channel frequency response 104 is fairly flat and shows low attenuation. The transmit spectrum 102 would have worse performance when placed at 2406 MHz, for example, where there is a fading dip in the spectrum. The radio channel of FIG. 1 has a coherence bandwidth of about 10 MHz.

One way of communicating over a frequency-selective carrier is by means of frequency hopping (FH), which is used, for example, in the BLUETOOTH® wireless technology system. See, for example, J. C. Haartsen, "The Bluetooth radio system," IEEE Personal Communications, Vol. 7, No. 1, February 2000. In the BLUETOOTH® wireless technology system, which is an ad-hoc system that operates in the unlicensed ISM band at 2.4 GHz, one of the reasons for employing FH over 79 carriers, each spaced apart from one another by 1-MHz, is to avoid transmitting on a single carrier that could be strongly attenuated for a long time period due to multi-path fading. Another reason for using FH is to have a system that is robust to interference from other users as well as from other impairments.

Frequency hopping is a way of averaging quality of the total available bandwidth and, in situations in which the carrier performance changes rapidly, FH often provides best-case real-world performance. However, in situations in which a portion of the bandwidth changes slowly, it would be desirable to further improve performance. For example, if a part of the bandwidth is disturbed by an almost static interferer, this part of the bandwidth should typically be avoided. A static interferer could, for example, be a switched-on microwave oven, since many microwave ovens use part of the ISM band.

Carriers that are operating in a part of the bandwidth that is disturbed by almost-static interferer(s) should be avoided. A procedure for selecting suitable carriers that are not affected by the almost-static interferer(s) would be desirable.

In addition, it is clear from FIG. 1 that regions in the frequency spectrum exist where the signal strength is low or is varying considerably. These regions should be avoided as well. Destructive multi-path conditions give rise to additional attenuation in specific frequency regions. In order to achieve acceptable performance, the output power of the transmitter needs to be increased to compensate for the additional loss. Moreover, if the signal bandwidth 106 of the transmit spectrum 102 is wide with respect to the variations in the channel frequency response (i.e. the signal bandwidth encompasses several fading dips), severe distortion of the signal results. This is because the delay difference between the different multi-paths is so large with respect to the symbol time, that symbols arriving from different paths interfere with one another. This self-interference is also referred to as Inter Symbol Interference or ISI.

Crucial for a system that dynamically determines which carrier to use is channel assessment. In the channel assessment scheme, the transceiver has to judge whether the considered carrier has both low interference conditions and a flat fading response. The latter becomes more important when signals with a wider signal bandwidth and with more complex modulation schemes are used. Interference can be measured by merely scanning a specific frequency band. No transmission is required from the associated transmitter. In contrast, the channel response can only be measured when the transmitter sends a signal with known characteristics.

In U.S. patent application Ser. No. 09/894,050 (henceforth, "the '050 application"), filed on Jun. 28, 2001 and entitled "Method and System for Dynamic Carrier Selection", and published as International Publication Number WO 02/37692 A2 on May 10, 2002, describes a system for applying dynamic carrier selection in a high-speed mode of BLUETOOTH® wireless technology. In the basic mode providing data rates up to 3 Mb/s, the BLUETOOTH® technology applies frequency hopping; in the high-speed (HS) mode providing data rates up to 12 Mb/s, the BLUETOOTH® technology applies dynamic carrier selection (DCS) of a static carrier which can be placed at 77 different positions in the 2.4 GHz ISM band. In the '050 application, a method is presented in which the receiver, operating in HS mode, regularly scans the ISM band to check for interference.

Yet another U.S. patent application, U.S. patent application Ser. No. 10/893,305, filed on Jul. 19, 2004, describes a method of finding parts in the channel frequency response 104 which are relatively flat. A flat spectrum prevents frequency-selective fading and allows the system to change to more complicated modulation schemes which provide higher data rates but are less tolerant of distortion. Also in U.S. patent application Ser. No. 10/893,305, a method is described applying a combined DCS and link adaptation scheme.

The afore-mentioned techniques work fine for avoiding interference, and provide flat channel conditions in fairly stable environments. When the transceivers are stationary, the channel frequency response does not vary over time. However, when the transceivers move, the multi-path environment constantly changes. As a result, the channel frequency response 104 also constantly changes. Measurements become less reliable and more often the system must switch to a new carrier frequency.

There is accordingly a need for a method and system that can provide reliable communications in a multi-path environment which is rapidly changing.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and systems that select a carrier frequency to be used to communicate information to a transceiver in a communication system. In some embodiments, selection includes, on each of one or more carrier frequencies, transmitting a probe message to the transceiver. The carrier frequencies are selected such that a frequency offset between any two adjacent ones of the carrier frequencies is at least about 8 MHz. One or more response messages are received from the transceiver, wherein each of the one or more response messages is a response to a received one of the one or more probe messages. The one or more response messages are used to determine which of the one or more carrier frequencies will be used to communicate information to the transceiver.

In some embodiments, each of the one or more response messages is received on a same carrier frequency as was used to transmit a corresponding one of the transmitted probe messages. In some embodiments, when only one response message is received from the transceiver (wherein the response message is received on a first carrier frequency), the method comprises selecting the first carrier frequency for use in communicating information to the transceiver. In another aspect, if two or more response messages are received from the transceiver (wherein each of the two or more response messages is received on a corresponding one of two or more carrier frequencies), the method comprises using information conveyed in each of the two or more response messages to determine which of the corresponding two or more carrier frequencies will be used to communicate information to the transceiver.

In yet other embodiments, each of the probe messages includes a training sequence. In another aspect, each of the one or more response messages includes a reception quality indicator; and the technique includes using at least one of the one or more reception quality indicators to determine which of a plurality of modulation schemes to use when communicating information to the transceiver.

In still other embodiments, the method includes ceasing to send probe messages to the transceiver in response to receiving only one response message. In one aspect of such embodiments, the one received response message is received on a first carrier frequency that was used to transmit a corresponding one of the transmitted probe messages; and the technique comprises selecting the first carrier frequency for use in communicating information to the transceiver.

In yet another aspect, a sequentially first one of the probe messages is transmitted on a best one of a number of candidate frequency carriers.

In alternative embodiments, selecting a carrier frequency to be used to communicate information to a transceiver in a communication system includes, on each of a plurality of carrier frequencies, sequentially transmitting a probe message to the transceiver. The carrier frequencies are selected such that a frequency offset between any two adjacent ones of the carrier frequencies is at least about 8 MHz. After transmitting a sequentially last one of the plurality of probe messages, one response message is received from the transceiver, wherein the one response message includes an identifier of a best carrier frequency that was assessed by the transceiver as being a best one of the plurality of carrier frequencies. The best carrier frequency is then used to communicate information to the transceiver. In some of these embodiments, the one response message is received on a predetermined one of the carrier frequencies.

In yet another aspect, a method of selecting a carrier frequency to be used to communicate information to a transceiver in a communication system includes selecting a first carrier frequency from a plurality of carrier frequencies and transmitting only a single probe message to the transceiver on the selected carrier frequency. If a response message is received from the transceiver, then the selected carrier frequency is used to communicate information to the transceiver. Otherwise, a different one of the carrier frequencies is selected, and the process of transmitting the single probe message on the selected frequency and then determining whether a response message is received from the transceiver is repeated until a termination condition is met. The termination condition includes detecting that the response message is received from the transceiver. In some of these embodiments, a frequency offset between any two adjacent ones of the plurality of carrier frequencies is at least about 8 MHz.

In still another aspect, selecting a carrier frequency to be used to communicate information to a transceiver in a communication system includes selecting a first carrier frequency from a plurality of carrier frequencies, detecting that a probe message was received from the transceiver on the selected carrier frequency, and transmitting a response message to the transceiver, wherein the response message includes an indication of a quality of reception of the probe. If the quality of reception of the probe is satisfactory, then the selected carrier frequency is used to communicate information with the transceiver. Otherwise, a different one of the carrier frequencies is selected, and the process of detecting that a probe message was received from the transceiver, transmitting a response message, and using the selected carrier frequency to communicate information with the transceiver if the quality of reception of the probe is satisfactory is repeated until a termination condition is met. The termination condition includes the quality of reception of the probe being satisfactory. In some of these embodiments, a frequency offset between any two adjacent ones of the plurality of carrier frequencies is at least about 8 MHz.

BRIEF DESCRIPTION OF THE DRAWINGS

A more complete understanding of the method and system of the present invention may be acquired by reference to the following Detailed Description when taken in conjunction with the accompanying drawings wherein.

DETAILED DESCRIPTION

Figure 1:
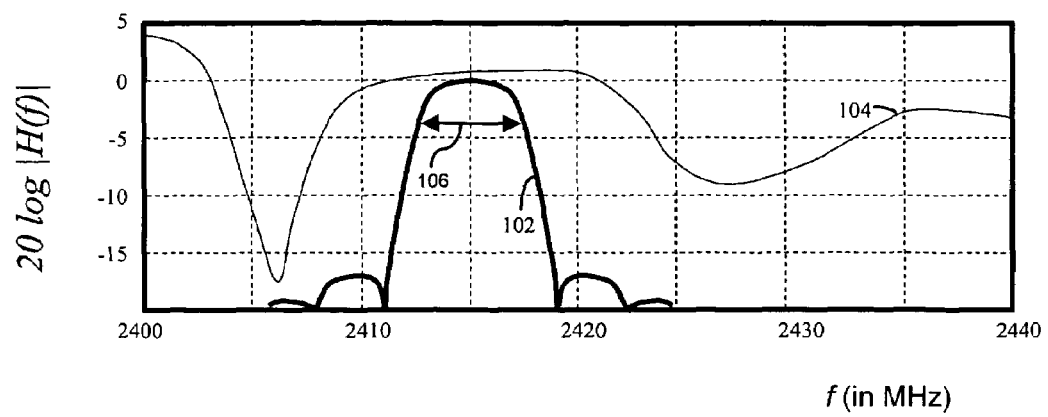
FIG. 1 is a graph that illustrates an exemplary radio channel response as a function of frequency ranging from 2400 to 2440 MHz, and an exemplary wideband transmission spectrum having a center frequency within that same frequency range.

The various features of the invention will now be described in connection with exemplary embodiments with reference to the figures, in which like parts are identified with the same reference characters.

To facilitate an understanding of the invention, many aspects of the invention are described in terms of sequences of actions to be performed by elements of a computer system. It will be recognized that in each of the embodiments, the various actions could be performed by specialized circuits (e.g., analog circuitry and/or discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

To summarize some aspects of the invention, techniques are presented for combating fading effects in a multi-path environment. Prior to communications, the transmitter sends a short probe message to the receiver on a first carrier frequency. If the message is received correctly, the receiver acknowledges this to the transmitter. In some embodiments, the transmitter subsequently transmits a second probe message on a second carrier frequency. The receiver only acknowledges receipt of the second probe message when the reception quality is better than that of the first probe message. The transmitter may continue to send probe messages on more carriers. The subsequent carriers to probe on may be listed in a candidate list or alternatively each next probe carrier may be included in the previous probe message. After the probing, the transmitter continues communications on the carrier which was indicated best by the receiver. The time interval between probe messages is preferably on the order of the coherence time of the channel, which is related to the Doppler spread. In a network having several links, probing is carried out for each link separately. These and other aspects of the invention will now be described in even greater detail.

If carrier performance changes slowly, it would be desirable to measure quality of an entire available bandwidth. Measurement of the entire available bandwidth reveals whether there are any parts of the bandwidth that should be avoided because of the presence of static interference and also shows which parts of the bandwidth are performing well and which are performing poorly due to frequency-selective fading. A system that can exploit the latter has been described in U.S. Pat. No. 6,519,460, which issued Feb. 11, 2003 ("Resource management in uncoordinated frequency hopping system,") and which is hereby incorporated herein by reference. The just-mentioned U.S. patent describes a high-speed (HS) mode that can be incorporated in, for example, the BLUETOOTH® wireless technology system.

A HS carrier operating according to the HS mode is based on a dynamic carrier selection (DCS) algorithm rather than on frequency hopping (FH). With DCS, carriers in the available bandwidth that are attractive both from a propagation (i.e., fading) and from an interference (i.e., low disturbance) point of view are selected.

To facilitate describing various exemplary embodiments, examples herein are based on a system operating according to the BLUETOOTH® wireless technology system (See, e.g., J. C. Haartsen, "The Bluetooth radio system," *IEEE Personal Communications, Vol.* 7, No. 1, February 2000) and according to the high-speed mode as described in the above-referenced U.S. Pat. No. 6,519,460. The BLUETOOTH® wireless technology system applies a 1-MHz-wide FH carrier that uses a pseudo-random FH sequence spanning the entire Industrial, Scientific, and Medical (ISM) band, whereas the high-speed carrier uses a semi-fixed, approximately 4 to 5 MHz-wide signal (at −3 dB) that employs dynamic carrier selection (DCS).

Figure 2:
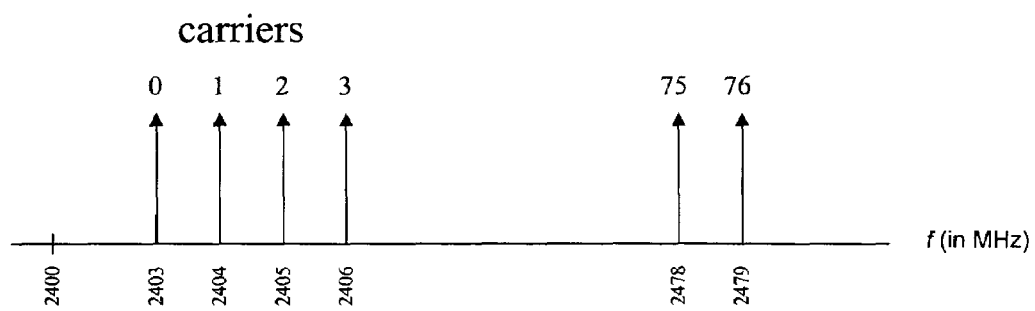
FIG. 2 is a diagram that illustrates a plurality of exemplary carriers of a system operating in accordance with the present invention.

Referring again to the figures, FIG. 2 is a diagram that illustrates a plurality of exemplary carriers of a system operating in accordance with the present invention. Carriers 0-76 are illustrated in a range from 2.4-2.4835 GHz, the carriers 0, 1, 2, 3, 75, and 76 being explicitly shown. The number of carriers depends on the available bandwidth and other system parameters. In FIG. 2, a given carrier is separated by 1 MHz from adjacent carriers (e.g., the carrier 1 operates at 2.404

GHz, while the carriers 0 and 2 operate at 2.403 GHz and 2.405 GHz, respectively). As should be apparent to those skilled in the art, the present invention is not restricted to a system based on the BLUETOOTH® wireless technology system, but, with appropriate modifications, can be used with other systems as well.

In an embodiment of the invention, the HS mode can be viewed as an extension mode of the BLUETOOTH® wireless technology system that can, for example, be entered into for a limited time when a higher data rate is desired. One such scenario could be when a large file is sent from a laptop computer to a printer. Another scenario could be communication of streaming video. A more detailed description of this mode can be found in the above-cited U.S. Pat. No. 6,519,460.

In a more advanced system, the HS mode will support different data rates which can be engaged depending on the channel conditions. For example, a robust Binary Phase Shift Keying (BPSK) scheme can be applied when conditions (fading and or noise/interference) are poor; a Quadrature Phase Shift Keying (QPSK) scheme can be used under medium channel conditions, and an 8-symbol Phase Shift Keying (8-PSK) scheme can be used under good channel conditions. For the remainder of the disclosure, a symbol rate of 4 Msymbols/s is assumed. With proper signal shaping, this gives a signal bandwidth 106 on the order of 4 to 5 MHz at −3 dB. At this symbol rate, the BPSK mode will support 4 Mb/s, the QPSK mode will support 8 Mb/s, and the 8-PSK mode will support 12 Mb/s. Interference conditions can be found with, for example, the methods described in the '050 application. Yet, the modulation scheme is very much dependent on the channel response: higher modulation schemes require a flatter channel response in order to maintain the linearity conditions.

To apply link adaptation, proper knowledge of the channel response is desirable. One could of course just try different modulation schemes and assess the performance based on Packet Error Rate (PER) and Bit Error Rate (BER). However, this may take quite some time before statistical reliability is obtained.

In the '050 application, the attenuation is determined by measuring the Received Signal Strength Indicator (RSSI) when the units are communicating in the FH mode. This is only feasible if indeed the units are communicating in the FH mode. Alternatively, RSSI measurements could be taken in the HS mode to reveal the attenuation conditions in the signal bandwidth 106. However, these RSSI measurements are carried out in a rather wide frequency bandwidth of the HS receiver, corresponding to the bandwidth of the HS channel. For the 4 to 5 MHz channel (at −3 dB), this means that the resolution of the measurements is worse than 4 MHz. With these measurements, it is not possible to determine whether the channel response is flat in the bandwidth of interest (i.e. occupied by the transmission spectrum 102). Preferably, the determination of the channel response in the band of interest is done with a finer resolution. A method for accomplishing this is described in the above-cited U.S. patent application Ser. No. 10/893,305. As described in that application, the FH receiver is used on the HS channel to take narrowband RSSI measurements. The signal being measured may, for example, be a signal intended for another recipient on the HS channel (i.e., not intended for reception by the measuring receiver). By using its FH rather than HS receiver, the measuring receiver is able to take high resolution measurement of the HS channel. This information (or information derived from the initial measurements) is saved for later use when the now-measuring receiver actually becomes an intended recipient of a HS transmission from the same transmitter.

Figure 3:
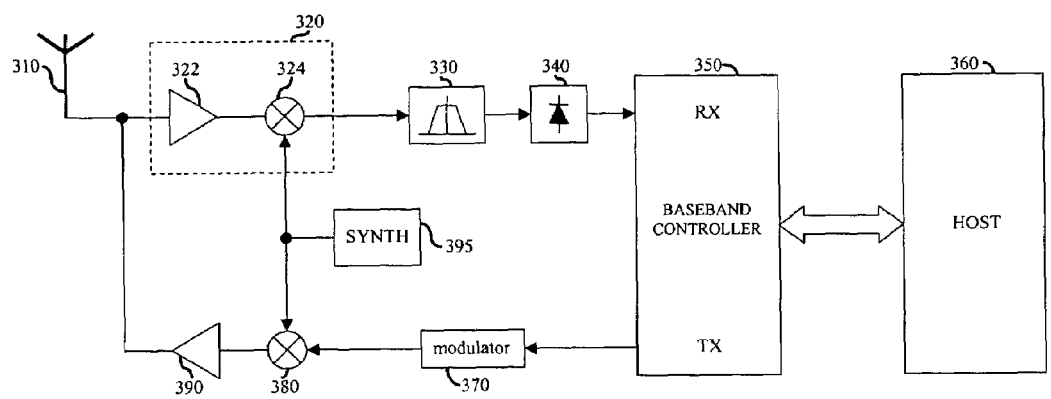
FIG. 3 is a schematic of a radio transceiver applied in an aspect of the invention.

A schematic diagram of an exemplary radio transceiver 300 applied in the current invention is shown in FIG. 3. Antenna 310 is used both for transmission and reception of radio waves. The front-end circuitry 320 comprising low noise amplifier (LNA) 322 and mixer 324 amplifies the signal and may down-convert the received signal to a suitable intermediate frequency (IF) or directly to direct current (DC). Channel filtering 330 and demodulation 340 either take place at a suitable IF frequency or at baseband. The bits provided by the demodulator 340 are further processed in the baseband controller 350 (e.g., error correction decoding, retransmission scheme handling and so on). Finally, user bits are provided to the host controller 360. In the reverse direction, user bits provided by the host controller 360 are provided to the baseband controller 350 where error correction bits may be added and the packetization takes place (e.g., a header is added and possibly preambles and trailers). The bits are then modulated on a suitable IF carrier in the modulator 370 and subsequently up-converted to an RF frequency in the mixer 380 and amplified in power amplifier 390. Finally, a synthesizer 395 provides the required frequencies and clocks.

Figure 4:
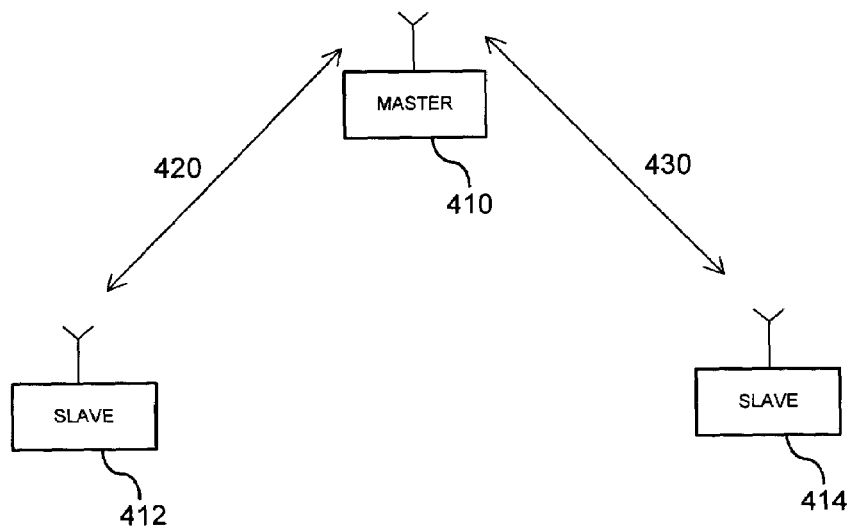
FIG. 4 is a scenario with two high-speed slaves connected to a master in a personal or local area network such as a BLUETOOTH® wireless personal area network.

The RSSI measurements reveal the channel frequency response 104. A Dynamic Channel Selection (DCS) scheme can now be used to select the most suitable (flat, low attenuation, and low interference) part of the channel. When the link becomes bad, the DCS has to decide on a new carrier frequency. The identity of this new frequency must be communicated to all the transceivers sharing the same carrier. At a precise point in time, all transceivers then switch to the new carrier. An example of a network 400 is shown in FIG. 4. In FIG. 4, a master 410 with two slaves 412 and 414 are shown. A star topology is assumed: two links 420 and 430 are used for communication between the master 410 and the two slaves 412, 414, respectively. All units include a dual-mode transceiver with a narrowband radio for supporting the FH mode and a broadband radio for supporting the HS mode. The master 410 can do measurements to assess the channel quality. It can also instruct the slaves 412, 414 to perform measurements and to inform the master 410 of the results. In the HS mode, the master 410 and all the slaves 412, 414 operate on a single carrier frequency. When this frequency becomes bad (for one or both slaves 412, 414), the network has to switch to a new frequency; that is, the master 410 and both slaves 412, 414 have to switch to this new frequency.

This method works fine when the channel is changing slowly because the DCS scheme has enough time to get a good channel assessment and to direct the units to a new carrier frequency if necessary. When the rate of change is small, the number of carrier changes per unit time is small, and the overhead provided by the DCS (including measuring) can be kept small. It becomes a problem, however, when the units move. Due to the movement, the channel changes continuously. Measurements are only reliable during a short time interval, and the DCS may have to direct the units to a new frequency quite often which reduces the capacity of the link. An additional problem is that the channel frequency response is space dependent. This means that the channel response between master 410 and slave 412 will be different from the channel response between master 410 and slave 414. The DCS scheme has to provide a carrier frequency that is suitable for both slaves. The situation worsens when the number of slaves increases; that is, it becomes more difficult to find a carrier that suites all slaves simultaneously.

In order to overcome the problems posed by these dynamics in a moving environment, techniques for determining on which carrier frequency the communications to a particular slave will take place are now described. The techniques make use of N candidate carrier frequencies. In this description it is assumed that N=2, but the techniques can easily be extended with more than 2 candidates. The candidate carrier frequencies can be selected based on measurements (see, e.g., assessment methods described above), or they can be selected at random. If based on measurements, it is preferred that only the interference be taken into account because the measurements of the channel frequency response vary too quickly.

In an aspect of the invention, the frequency offset between the candidate carrier frequencies should be large enough to provide frequency diversity. However, they preferably are not much larger than the coherence bandwidth of the channel frequency response 104. Alternatively, the frequency offset between the candidate carrier frequencies may be selected such that it is on the order of half the coherence bandwidth because at this distance it is very likely that one carrier will have low attenuation provided the other carrier is in a fading dip.

Because of its importance in determining the set of candidate carrier frequencies in accordance with the invention, the coherence bandwidth will now be explained in greater detail. The coherence bandwidth $B_c$ is a statistical measure representing the range of frequencies over which two frequency components show strong amplitude correlation. The coherence bandwidth is determined by the amount of multipath delay in the propagation environment. Multipath delay results from the radio propagation taking different paths from the transmitter to the receiver. When the paths differ in length, the times of arrival of the various radio waves differ, resulting in amplitude variations in the channel frequency response 104 as a function of the frequency as shown in FIG. 1. The extent of multipath delay is normally expressed in terms of the root mean square (rms) delay spread, $\sigma_\tau$. This value is derived from the time delay of the different paths weighted by their signal strength. The coherence bandwidth is inversely proportional to the rms delay spread. If the coherence bandwidth is defined as the bandwidth over which the frequency correlation is above 0.5, then the coherence bandwidth can be approximated by $$B_c = \frac{1}{5 \cdot \sigma_\tau}.$$

The rms delay spread, $\sigma_\tau$, is determined by the propagation environment. For an indoor home or office environment, the rms delay spread is on the order of 10-20 nanoseconds. For short range communications as described in this document, in practice an rms delay spread of 25 nanoseconds is the worst case to expect. The interested reader can learn more about this 25 nanosecond delay spread channel in Gerard J. M. Janssen et al., "Wideband Indoor Channel Measrements and BER Analysis of Frequency Selective Multipath Channels at 2.4, 4.75, and 11.5 GHz", IEEE TRANSACTIONS ON COMMUNICATIONS, vol. 44, no. 10, pp. 1272-1288, October 1996. This delay spread corresponds to a coherence bandwidth of 8 MHz or greater. Frequencies spaced apart from one another by an offset larger than the coherence bandwidth, $B_c$, quickly become uncorrelated. When the probe frequencies as described in this document are spaced by about 8 MHz or more, the frequencies are uncorrelated for most of the indoor scenarios, which provides the desired frequency diversity. The term "about" is used here because how close to the 8 MHz lower limit one achieves in any practical embodiment will depend on the particular channel conditions being designed for, as well as how accurately the hardware is capable of achieving the nominal 8 MHz target frequency spacing.

The coherence bandwidth is related to the range of frequencies over which the amplitude response is fairly flat. Therefore, the coherence bandwidth can be approximated by measuring the width of relatively flat areas in the channel frequency response 104 as shown in FIG. 1. Further details about coherence bandwidth can be found, for example, in the book T. S. Rappaport, "Wireless Communications, Principles and Practice, $2^{nd}$ edition," Prentice Hall PTR, New Jersey, ISBN 0-13-042232-0.

The coherence bandwidth can be determined in accordance with any of a number of known techniques. For example, the above-referenced '050 application describes a number of techniques including one that is performed when the system is operating in the FH mode. In this mode, initial carrier measurements are taken. Interference levels in the total available bandwidth are determined by measuring the strength of received signals that can be used in the event that the desired signal is absent. The interference measurements are taken over a period long enough to average out random (i.e., non-static) interferers. In addition to this interference measurement, the desired signal can be monitored by making use of a relative received signal strength indicator (RSSI) value upon reception of valid packets. The relative RSSI value directly reveals parts of the spectrum in which flat-fading dips due to multi-path interference are occurring. If packets are not correctly received, the carrier is considered poor even if the RSSI value is good, the reason being that either there is interference, which can be derived from the interference level measurements, or inter-symbol interference (i.e., self-interference) has occurred due to frequency-selective fading. The RSSI measurements together with the interference measurement provide a good indication of where the carriers are good, where they are bad due to interference, and where they are bad due to flat or frequency-selective fading.

Alternatively, channel measurements can be made in accordance with those described in the above-mentioned U.S. patent application Ser. No. 10/893,305, which is hereby incorporated herein by reference. As described in that application, the FH receiver is used on the HS channel to take narrowband RSSI measurements of a signal intended for another recipient on the HS channel (i.e., not intended for reception by the measuring receiver).

Once the measurements of the available radiofrequency spectrum (e.g., the ISM band) are taken, the coherence bandwidth may be determined. To avoid burdening the master and slave units with having to take these measurements and dynamically determine the coherence bandwidth, all of the embodiments described herein can base the frequency offset between candidate carriers on a typical coherence bandwidth value (i.e., a coherence bandwidth that has been previously determined to be representative of the actual coherence bandwidth that the units can expect to encounter in real-world operating conditions). For example, in the exemplary embodiments described herein a coherence bandwidth on the order of 10-15 MHz might be assumed for all cases.

Figure 5:
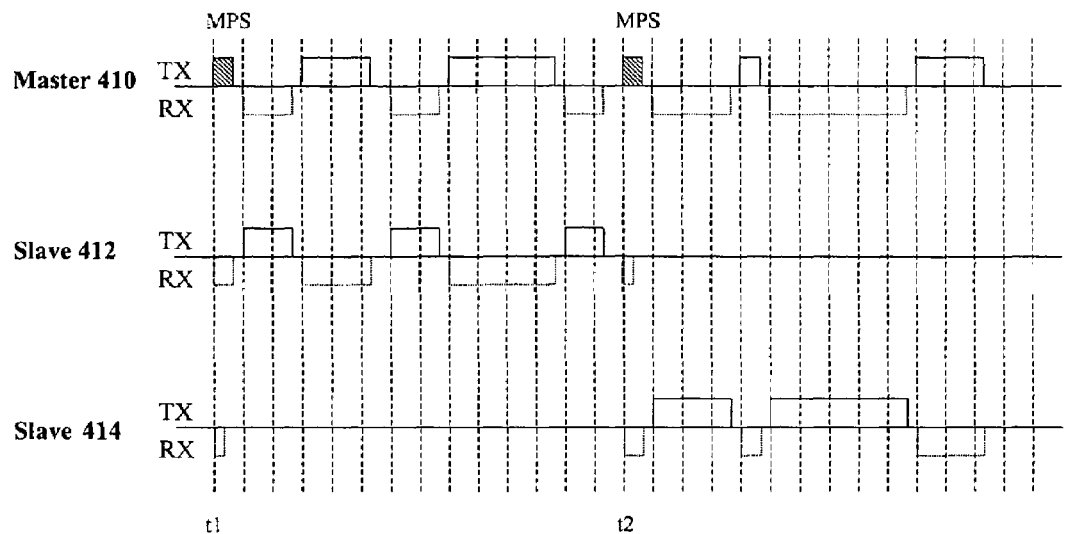
FIG. 5 is a timing diagram showing exemplary activity of the master and slaves in the high-speed mode.

On the HS channel, master priority slots (MPS) have been defined (see U.S. patent application Ser. No. 09/710,204, filed Nov. 9, 2000 and published as International Publication Number WO 01/58077). These slots define points in time when the master 410 has unconditional access to the link and decides which slave to address. During the interval until the next MPS, the master 410 only communicates with the single slave it selected at the beginning of the interval. At the next MPS, a different slave can be selected. This is illustrated in FIG. 5 where we assume the network of FIG. 4 and that the master 410 sequentially communicates with slaves 412 and 414. Assume that the master has selected two candidate carriers F1 and F2. At t=t1, both slaves listen to the header of the master packet. This header includes the address of the slave that will be addressed during the next interval. In this example, slave 412 is addressed at t=t1. Slave 414 will therefore return to a sleep or a suspend mode until the next MPS at t=t2. It can be seen that the master 410 and slave 412 communicate exclusively with one another in the interval between t1 and t2. At t=t2, slave 412 enters a sleep mode and slave 414 begins communicating with the master 410. In this example, only a single carrier frequency is used. Communications on links 420 and/or 430 may be hampered by frequency-selective fading phenomena.

Figure 6:
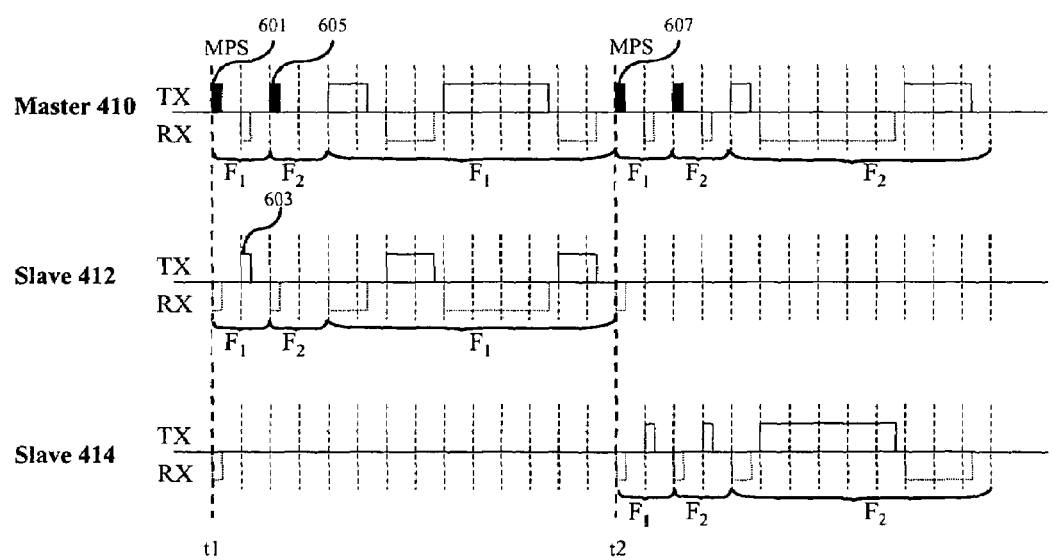
FIG. 6 is a timing diagram showing exemplary activity of the master and slaves according to one embodiment.

FIG. 6 shows an embodiment in accordance with an aspect of the invention to overcome the fading problem. Before communicating with a slave 412 at a MPS, the master 410 sequentially sends two probes (which are short messages including the address of the slave) on each of two candidate carrier frequencies F1 and F2. The frequency difference between F1 and F2 is such that if one of the carriers is in a fading dip, it will be highly likely that the other one is not. As mentioned earlier, this may be accomplished by basing the frequency offset between F1 and F2 on the coherence bandwidth (or a previously determined typical coherence bandwidth) of the channel response 104. For example, the frequency offset between F1 and F2 may be set to be just larger than the coherence bandwidth. In this way, F1 and F2 are completely uncorrelated. Alternatively, the frequency offset between F1 and F2 may be set to be on the order of half the coherence bandwidth (or typical coherence bandwidth) of the channel response 104. While this will result in there being some correlation between F1 and F2, it makes it very unlikely that both F1 and F2 will be in a fading dip at the same time.

Continuing now with reference to FIG. 6, at t=t1 the master 410 sends a probe 601 on F1. If the slave 412 receives the probe 601 properly and the quality is above a threshold for supporting communications with sufficient quality, it will send a response 603 back, also on carrier frequency F1. This response 603 can be a very short packet as well. In some embodiments, the response 603 includes information informing the master 410 of the quality of reception of the corresponding probe 601. If the probe 601 was not received correctly or its reception was not of sufficient quality, the slave 412 will not return a response.

Next, the master 410 sends a probe 605 on F2. If this second probe 605 is received with a higher quality than the first probe 601 on F1, the slave 412 will return a response message (not shown) (so it sends a response again if the first probe was also responded to) on F2. If, as illustrated in FIG. 6, the second probe 605 is not received correctly or if the reception quality is worse compared with the first probe 601, the slave 412 will not send a response. Since, in this example, there are only two candidate carrier frequencies, the master 410 will continue on one of the candidate carriers F1 or F2 based on the response information supplied by the slave 412. The master 410 will continue to communicate with this slave 412 on this selected carrier until the next MPS. In the example of FIG. 6, slave 412 only received the first probe 601 on F1 correctly, so the master 410 continues on carrier F1. It should be noted that communication of the probes and the corresponding responses takes place in the same mode of operation (e.g., the HS mode in accordance with BLUETOOTH® standards) as the remaining communication between the master 410 and the slave. There is no need to drop down to another mode (e.g., FH mode in accordance with BLUETOOTH® standards) to communicate the probes and their corresponding responses. Indeed, it is desirable that communication of the probes take place in the same mode of operation as the remaining communication between the master 410 and the slave because this will ensure that the reception quality measurement obtained from the probe will be truly representative of the quality of reception that can be expected if the probe's carrier frequency is selected for use in subsequent communications.

At t=t1, slave 414 also listens to the master transmission. If it receives the first probe 601 correctly, the address information in the probe will reveal that the transmission is intended for slave 412. Slave 414 can therefore enter a sleep or suspend mode until the next MPS. Alternatively, if slave 414 does not receive the first probe 601 correctly at t=t1, it will then continue to listen for subsequent probe messages (not shown) until a correct probe message has been received. At the next MPS at t=t2, the master 410 can repeat the probing scheme to the next slave 414 by, for example, sending the probe 607 on F1.

Figure 7:
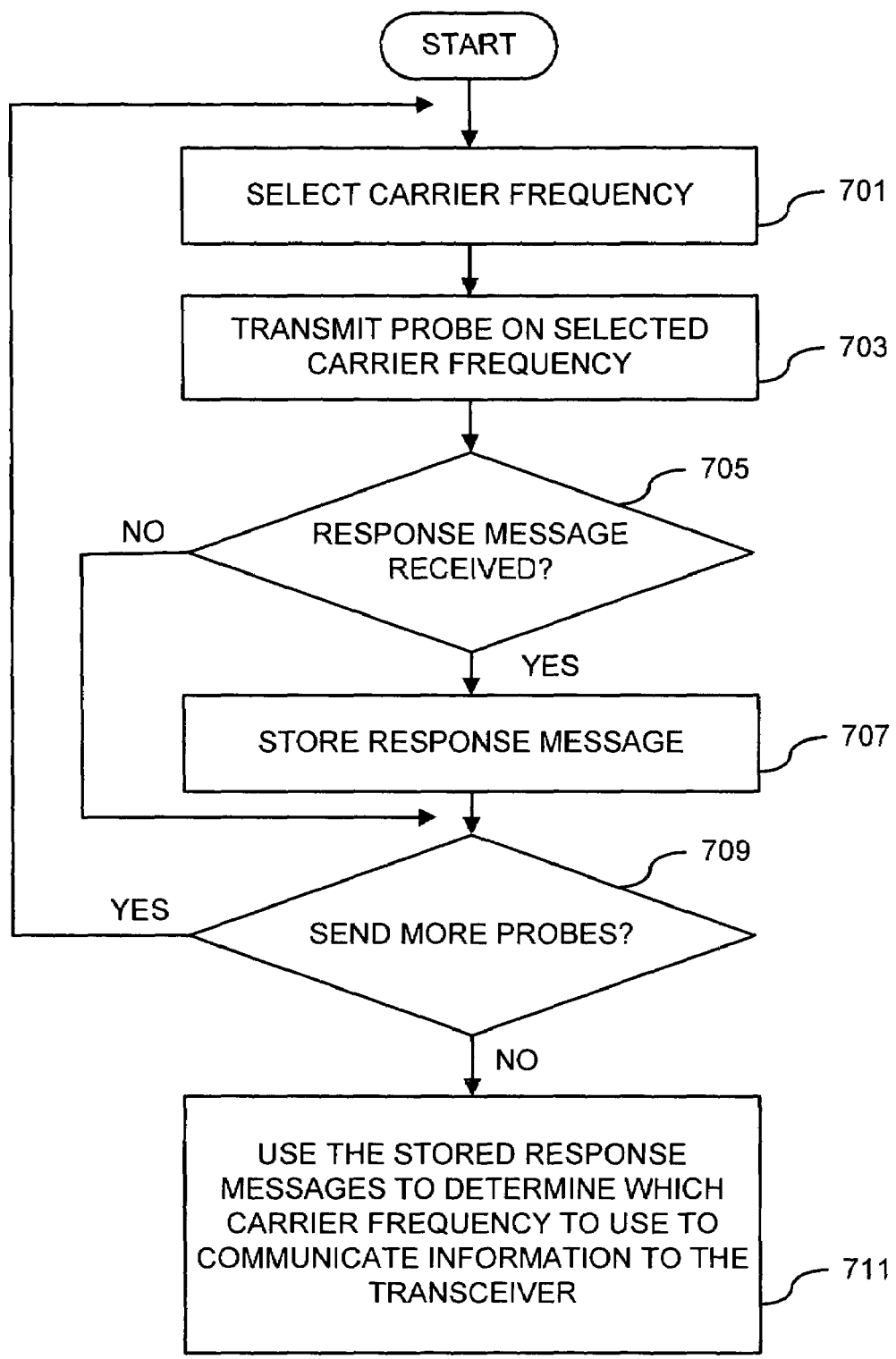
FIG. 7 is a flow diagram of steps carried out in a master unit in accordance with an embodiment of the invention.

FIG. 7 is a flow diagram of steps carried out in a master unit in accordance with an embodiment of the invention. The master 410 selects one of a number of available carrier frequencies (step 701). The available carrier frequencies are preferably spaced apart from one another by a frequency offset based on the coherence bandwidth (or typical coherence bandwidth) of the channel frequency response 104. A probe is then transmitted on the selected carrier frequency (step 703). The master 410 then determines whether a response message was received in response to the transmitted probe (decision block 705). If a response message was received ("YES" path out of decision block 705), then the received response is stored in a memory (step 707).

Following step 707, or if no response was received ("NO" path out of decision block 705), the master 410 determines whether it needs to send more probes (decision block 709). For example, the master 410 might determine whether a probe has already been transmitted on each of the possible carrier frequencies. If there are more probes to be sent ("YES" path out of decision block 709), then the processing continues back at step 701. If there are no more probes to be sent ("NO" path out of decision block 709), then the stored response messages are used to determine which carrier frequency to use to communicate information to the slave (step 711).

Figure 8:
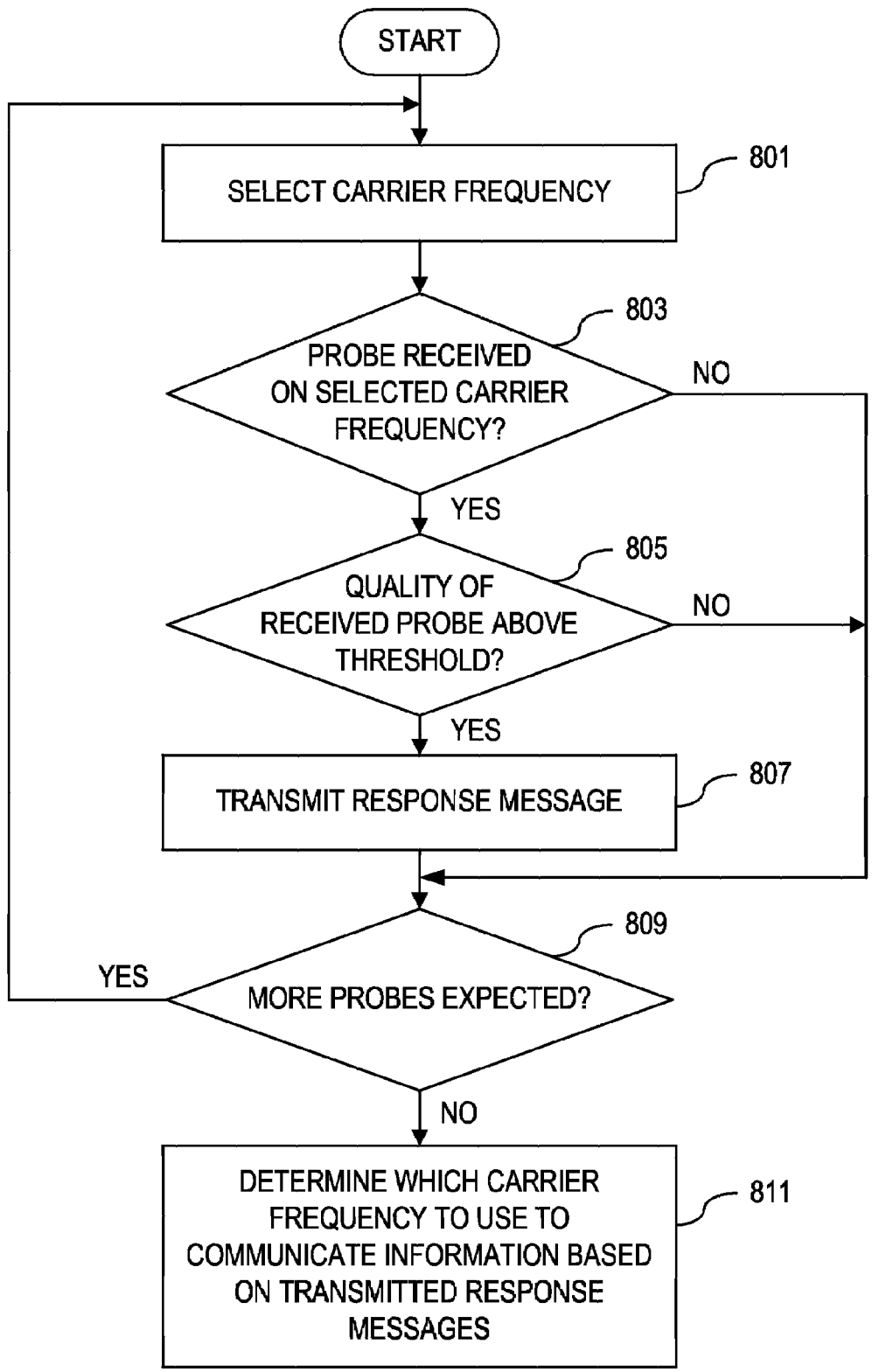
FIG. 8 is a flow diagram of steps carried out in a slave unit in accordance with an embodiment of the invention.

FIG. 8 is a flow diagram of steps carried out in a slave unit in accordance with an embodiment of the invention. The slave unit begins by selecting one of a number of available carrier frequencies (step 801). The slave then monitors the selected frequency (e.g., during a time slot established in accordance with applicable wireless technology standards) and determines whether a probe message has been received on the selected carrier frequency (decision block 803). If no probe message was detected ("NO" path out of decision block 803), processing continues at decision block 809, where the slave determines whether it can expect to receive more probes. For example, the slave might determine whether sufficient time has elapsed that each of the possible carrier frequencies will have been used to transmit a probe. If there are more possible probes to check for, ("YES" path out of decision block 809), then the processing continues back at step 801.

Returning now to a consideration of decision block 803, if a probe message was detected on the selected frequency ("YES" path out of decision block 803), the slave compares a measure of reception quality associated with the probe message with a threshold value, and uses the results of this comparison to determine whether the reception quality was acceptable (decision block 805). If the reception quality of the received probe message was not good enough ("NO" path out of decision block 805), processing continues at decision block 809, where the slave determines whether it can expect to receive more probes. If there are more possible probes to check for, ("YES" path out of decision block 809), then the processing continues back at step 801.

Returning now to a consideration of decision block 805, if the reception quality of the received probe was acceptable ("YES" path out of decision block 805), the slave unit transmits a response message (807). Following this step, the slave proceeds to decision block 809, where the slave determines whether it can expect to receive more probes. If there are more possible probes to check for, ("YES" path out of decision block 809), then the processing continues back at step 801.

If the slave does not expect to receive any additional probe messages ("NO" path out of decision block 809), the slave unit then determines which carrier frequency to use to communicate information based on the information represented by the transmitted response messages.

For the first time through the loop, the threshold value used in decision block 805 is preferably a value representing a minimum required quality of reception. In some embodiments, this value may remain static through further passes of the processing loop. However, in other embodiments the threshold value may be dynamically adjusted upward to reflect the reception quality of the last received probe that caused a response message to be sent in block 807. For example, if a first received probe has a reception quality that is greater than an initial threshold value, $threshold_1$, a response message will be transmitted corresponding to the first probe (block 807) and the threshold value will be adjusted to a new value, $threshold_2$, to represent the reception quality of the first probe. In this way, subsequently received probes must at least exceed the reception quality of the first received probe in order for a response message to be transmitted. With every new probe that passes the test at decision block 805, the threshold is adjusted to reflect the improved performance. In this way, the master will receive subsequent response messages only when the reception quality of a probe is greater than that of earlier-sent probes. As used throughout this document, the term "threshold value" is used generically to include both static and dynamically adjusted threshold values as just described.

Probes do not have to be sent every MPS. The rate of change of the channel is determined by the velocity of the units. The channel is relatively constant during an interval called the coherence time. The coherence time is inversely proportional to the Doppler spread which is determined by the velocity of the units. With a velocity of 1 m/s, the Doppler spread is 8 Hz and the coherence time is about 60 ms. This means that the channel is rather constant over a time interval of 60 ms. Consequently, probes to the same slave should be sent only every 50 ms or so.

Other aspects and embodiments can provide other performance benefits in addition to those obtained by the techniques described above and illustrated in FIG. 6. In one embodiment, the probe may include a special training sequence from which the quality for different modulation schemes can be derived. For example, in the HS mode three modulation schemes are supported: BPSK, QPSK, and 8-PSK. From the received training sequence, the slave may derive which modulation scheme(s) can be supported by the particular carrier the probe message was sent on. The quality figure can be signaled in the response message sent from the slave to the master 410. The master 410 then uses this information to determine which of the available modulation schemes to use when next communicating with the slave. Such a step could be performed, for example, subsequent to taking the "NO" path out of decision block 709 in FIG. 7. In addition, in some embodiments this information can be used for determining which carrier frequency to use when next communicating with the slave.

In another embodiment, the master 410 only sends a subsequent probe on a subsequent candidate carrier frequency when the receive quality of the preceding probe(s) was (were) not acceptable. A receiver that responds to a probe sent on frequency Fx signaling the quality is okay, will not switch to a different frequency to receive another probe, but will continue to listen to Fx to proceed with the communications. When the first probe is always sent on a frequency which offers sufficient quality, only a single probe needs to be sent. This reduces overhead thus improving efficiency.

Figure 9A:
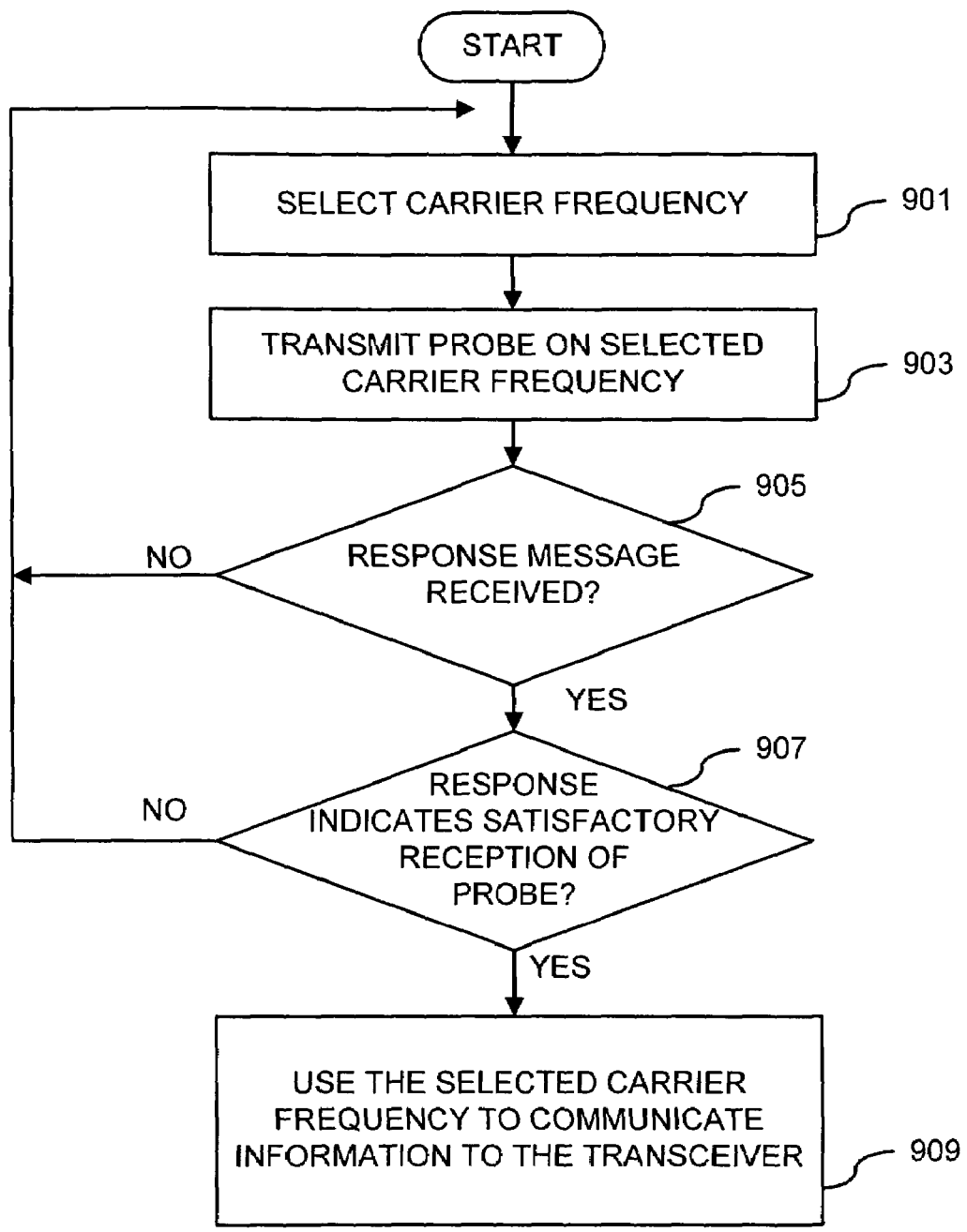
FIGS. 9*a* and 9*b* are flowcharts depicting steps performed in the master and slave units in accordance with an alternative embodiment.

This embodiment will first be described with reference to FIGS. 9a and 9b, which are flowcharts depicting steps performed in the master and slave units, respectively. Referring first to FIG. 9a, the master 410 selects one of a number of available carrier frequencies (step 901). The available carrier frequencies are preferably spaced apart from one another by a frequency offset based on the coherence bandwidth (or typical coherence bandwidth) of the channel frequency response 104. A probe is then transmitted on the selected carrier frequency (step 903). The master 410 then determines whether a response message was received in response to the transmitted probe (decision block 905). If no response message was received ("NO" path out of decision block 905), this is likely indicative that the probe was not received by the slave. Accordingly, processing continues back at block 901 to select another candidate carrier frequency to try again with another probe.

If a response message was received ("YES" path out of decision block 905), then the information in the received response is examined to determine whether it indicates that the quality of reception of the probe was satisfactory (decision block 907). If reception was not satisfactory ("NO" path out of decision block 907), processing continues back at block 901 to select another candidate carrier frequency to try again with another probe.

If the information in the probe indicates satisfactory reception ("YES" path out of decision block 907), then no further probes will be sent, and processing continues at block 909, where the most recently selected candidate carrier frequency is selected for use in communicating information to the slave. Thus, as soon as a satisfactory candidate carrier frequency is found, it is selected for further communication between the master and slave.

Figure 9B:
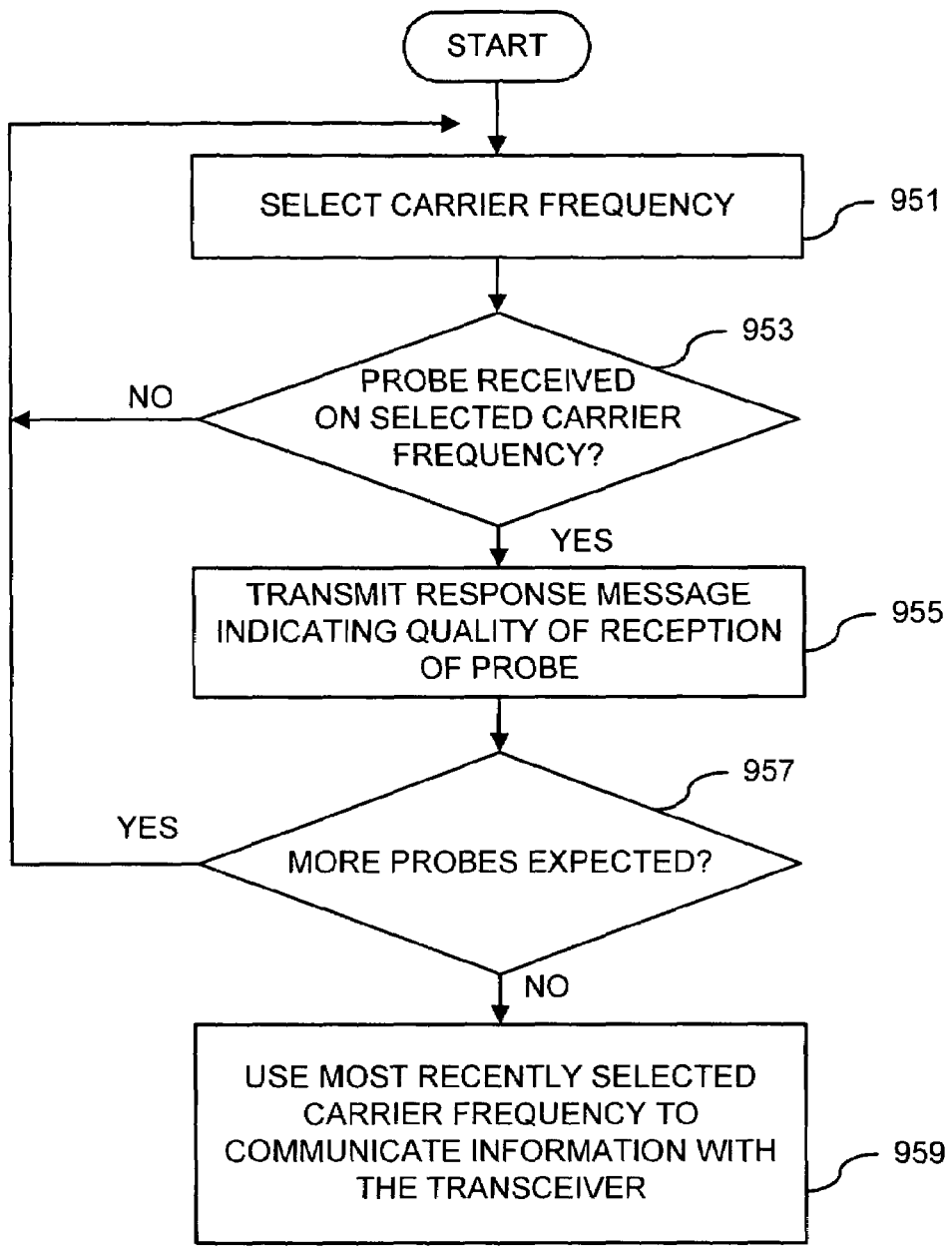

FIG. 9b is a flow diagram of steps carried out in a slave unit in accordance with this embodiment. The slave unit begins by selecting one of a number of available carrier frequencies (step 951). The slave then monitors the selected frequency (e.g., during a time slot established in accordance with applicable wireless technology standards) and determines whether a probe message has been received on the selected carrier frequency (decision block 953). If no probe message was detected ("NO" path out of decision block 953), processing continues back at block 951 to select another candidate carrier frequency and repeat the process.

If a probe message was detected on the selected frequency ("YES" path out of decision block 953), the slave compares a measure of reception quality associated with the probe message with a threshold value, and uses the results of this comparison to determine whether the reception quality was acceptable. This information is then encoded into a response message and transmitted back to the master (block 955).

Following this step, the slave proceeds to decision block 957, where the slave determines whether it can expect to receive more probes. That is, if the slave reported to the master that reception of the probe was unsatisfactory, then it can expect to receive another probe; otherwise no further probes will be expected. If there are more possible probes to check for, ("YES" path out of decision block 957), then the processing continues back at step 951.

If the slave does not expect to receive any additional probe messages ("NO" path out of decision block 957), the slave unit then uses the most recently selected candidate carrier frequency to communicate information between itself and the master 410 (block 959).

Figure 10A:
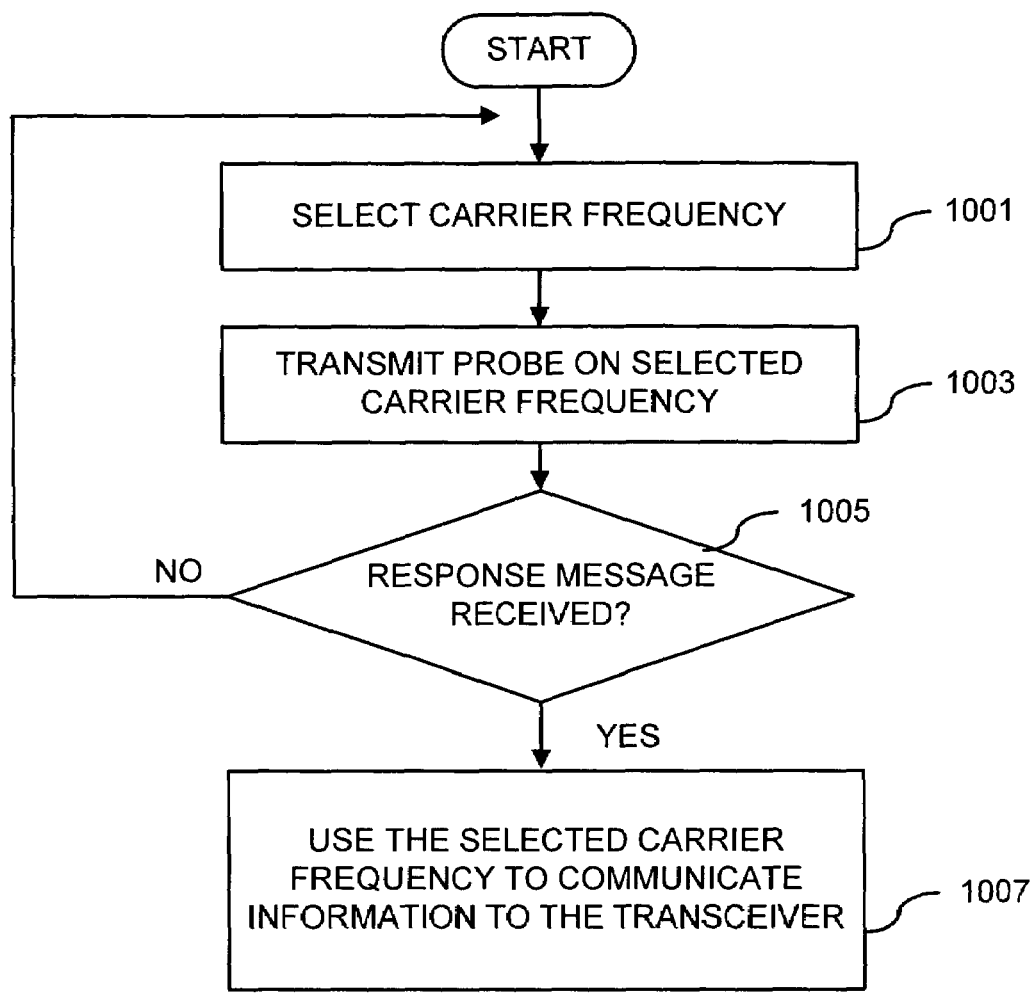
FIGS. 10*a* and 10*b* are flowcharts depicting steps performed in the master and slave units in accordance with another alternative embodiment.

Yet another embodiment, employing the principles outlined above, will now be described with reference to FIGS. 10a and 10b, which are flowcharts depicting steps performed in the master and slave units, respectively. In this embodiment, a response message is sent by the slave only when the reception quality of a received probe is satisfactory; otherwise no response is sent. Referring first to FIG. 10a, the master 410 selects one of a number of available carrier frequencies (step 1001). The available carrier frequencies are preferably spaced apart from one another by a frequency offset based on the coherence bandwidth (or typical coherence bandwidth) of the channel frequency response 104. A probe is then transmitted on the selected carrier frequency (step 1003). The master 410 then determines whether a response message was received in response to the transmitted probe (decision block 1005). If no response message was received ("NO" path out of decision block 1005), this is likely indicative that the probe was not received by the slave, or was not received with sufficient reception quality. Accordingly, processing continues back at block 1001 to select another candidate carrier frequency to try again with another probe.

If a response message was received ("YES" path out of decision block 1005), this automatically indicates that the quality of the most recently selected candidate carrier frequency is satisfactory, so no further probes will be sent. Accordingly, processing continues at block 1007, which selects the most recently selected candidate carrier frequency for use in communicating information between itself and the slave. Thus, as soon as a satisfactory candidate carrier frequency is found, it is selected for further communication between the master and slave.

Figure 10B:
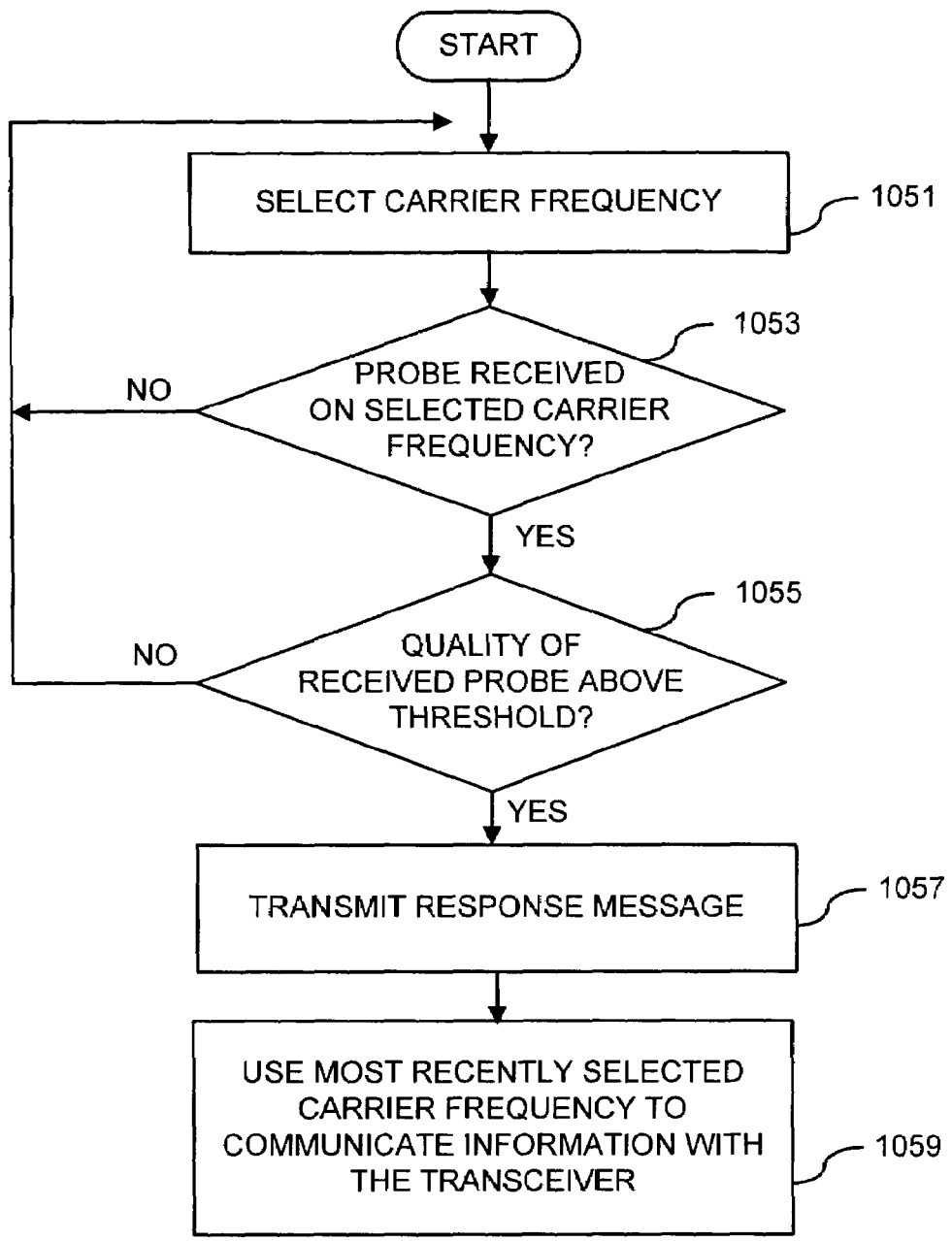

FIG. 10b is a flow diagram of steps carried out in a slave unit in accordance with this embodiment. The slave unit begins by selecting one of a number of available carrier frequencies (step 105 1). The slave then monitors the selected frequency (e.g., during a time slot established in accordance with applicable wireless technology standards) and determines whether a probe message has been received on the selected carrier frequency (decision block 1053). If no probe message was detected ("NO" path out of decision block 1053), processing continues back at block 1051 to select another candidate carrier frequency and repeat the process.

If a probe message was detected on the selected frequency ("YES" path out of decision block 1053), the slave compares a measure of reception quality associated with the probe message with a threshold value, and uses the results of this comparison to determine whether the reception quality was acceptable (decision block 1055). If reception quality was not acceptable ("NO" path out of decision block 1055), the slave does not send any response to the master 410, but instead continues processing back at block 1051 where another candidate carrier frequency will be selected and the process repeated.

If the reception quality of the most recent probe was acceptable ("YES" path out of decision block 1055), the slave transmits a response message back to the master 410 (block 1057). As mentioned earlier, the existence of the response message is, itself, an indicator that the most recently selected candidate carrier is satisfactory for continued use by the master 410 and slave. Thus, the slave unit then uses the most recently selected candidate carrier frequency to communicate information between itself and the master 410 (block 1059).

In the various embodiments described herein, it is preferable that the "best" candidate carrier frequency be used to send the first probe. A candidate list can be made with the carriers ordered from best to worst. The first probe is sent on the best carrier, the second probe on the second-best carrier, and so on. The list can be updated based on the results of the receiver responses in the past, or based on the measurements described earlier. The list of candidate carriers will be determined in the master 410 and must be communicated to the slaves 412, 414. Alternatively, the identity of only the first probe carrier is communicated to the slave (e.g., this may be communicated by means of a robust control channel) and there is an indication in the probe message informing which carrier will be probed next provided that another probe is following. Techniques for communicating to the slave the identity of the first probe carrier include sending it via a robust control channel that has been established between the master 410 and the slave. Such robust control channels may also be used for other embodiments described herein, such as to communicate an entire list of candidate carriers from a master 410 to a slave, or in embodiments such as that depicted in FIGS. 6 and 7 to communicate the identity of a next probe carrier to be used. Techniques for establishing such robust control channels are known, and need not be described here in detail.

Figure 11:
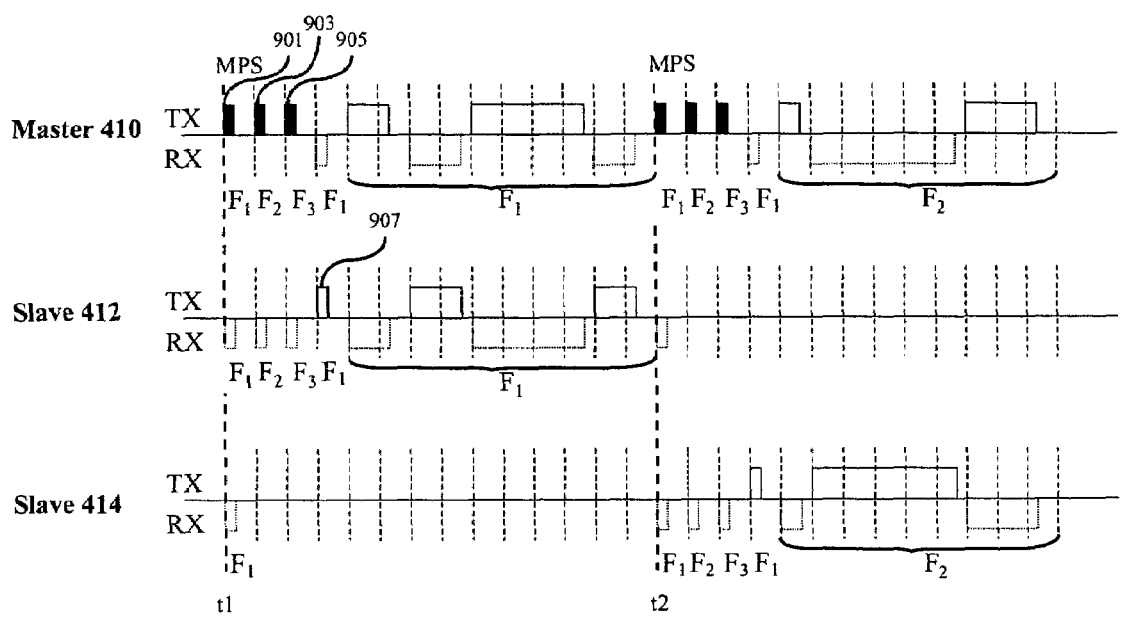
FIG. 11 is a timing diagram showing exemplary activity of the master and slaves according to yet another alternative embodiment.

In yet another embodiment, the master sends probe messages on different frequencies without waiting for a response. The receiver responds only with a single acknowledgement message indicating which carrier frequency is assessed to be best. This method is illustrated in FIG. 11. In the example, the master 410 sends three probe messages 1101, 1103, 1105 sequentially (beginning at t=t1) on frequencies F1, F2, and F3. The slave 412 waits until all probes have been sent and then returns a response 1107 with the results on, for example, the agreed frequency F1.

Figure 12:
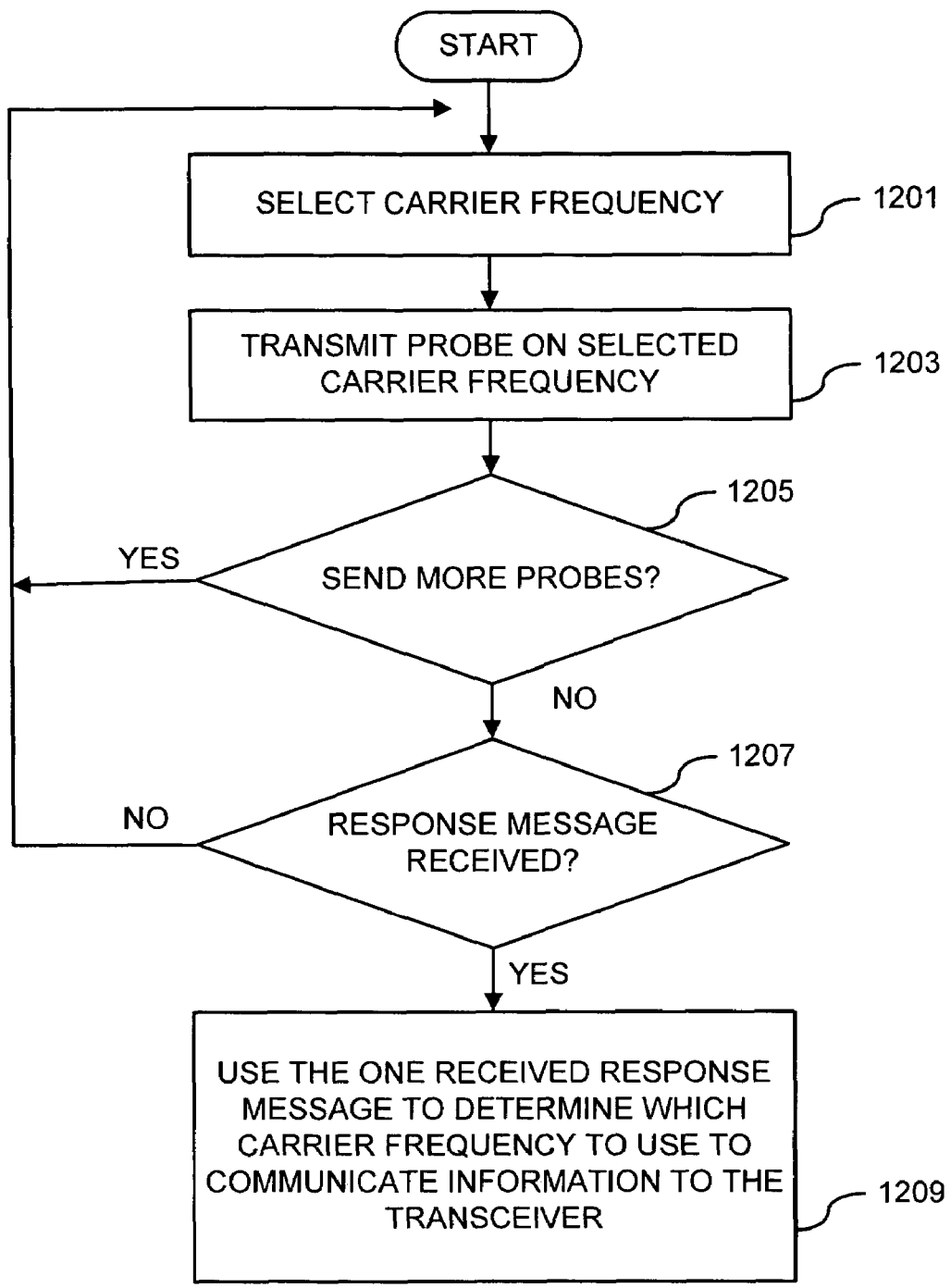
FIG. 12 is a flow diagram of steps carried out in a master unit in accordance with yet another alternative embodiment.

FIG. 12 is a flow diagram of steps carried out in a master unit in accordance with this embodiment of the invention. The master 410 selects one of a number of available carrier frequencies (step 1201). A probe is then transmitted on the selected carrier frequency (step 1203). The master 410 then determines whether it needs to send more probes (decision block 1205). For example, the master 410 might determine whether a probe has already been transmitted on each of the possible carrier frequencies. If there are more probes to be sent ("YES" path out of decision block 1205), then the processing continues back at step 1201. If there are no more probes to be sent ("NO" path out of decision block 1205), then the master 410 determines whether a response message was received (decision block 1207). If a response message was received ("YES" path out of decision block 1207), then the master 410 uses the received response message to determine which carrier frequency to use to communicate information to the transceiver. If no response message was received ("NO" path out of decision block 1207), then this suggests that none of the probe messages were received by the slave with sufficient reception quality (or received at all) to permit communication. Under these circumstances, the master might try repeating the entire process for all of the possible carrier frequencies by returning to step 1201, with the hopes that reception conditions will have improved. Alternatively, in some embodiments the master can take suitable steps to switch communications to a more robust (e.g., low speed) type of communication with the slave.

Figure 13A:
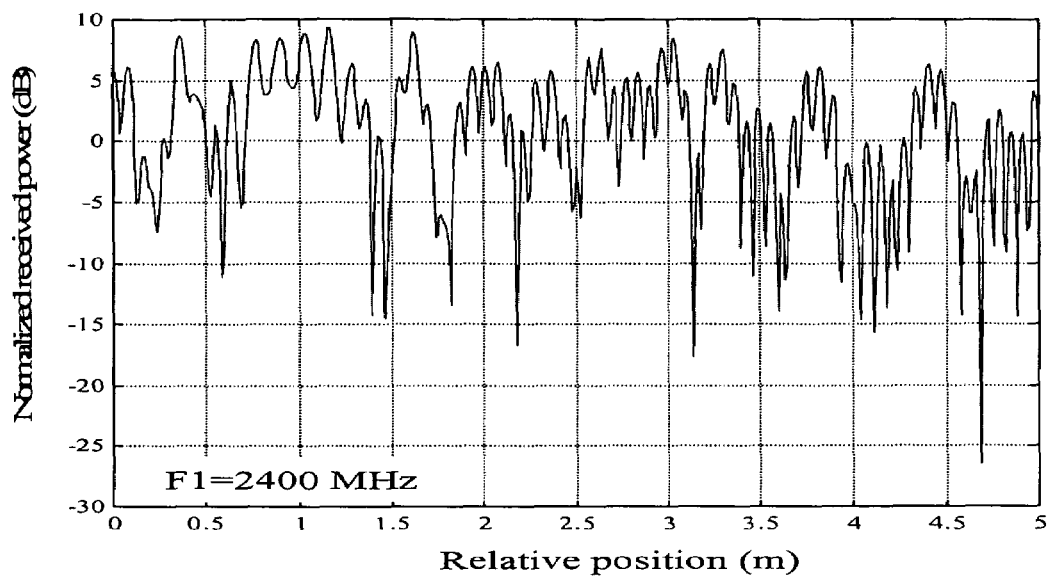
FIGS. 13*a*, 13*b*, and 13*c* show examples of the radio attenuation as a function of the position of the receiver for a) a frequency 2400 MHz, b) a frequency 2420 MHz, and c) when the best frequency is chosen for each position according to an aspect of the invention.
Figure 13B:
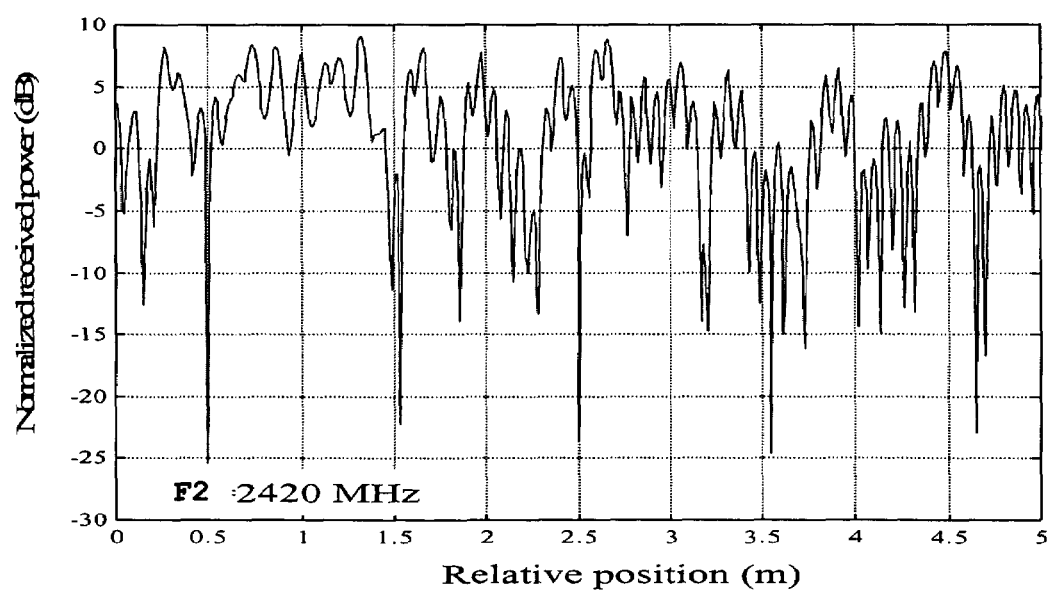
Figure 13C:
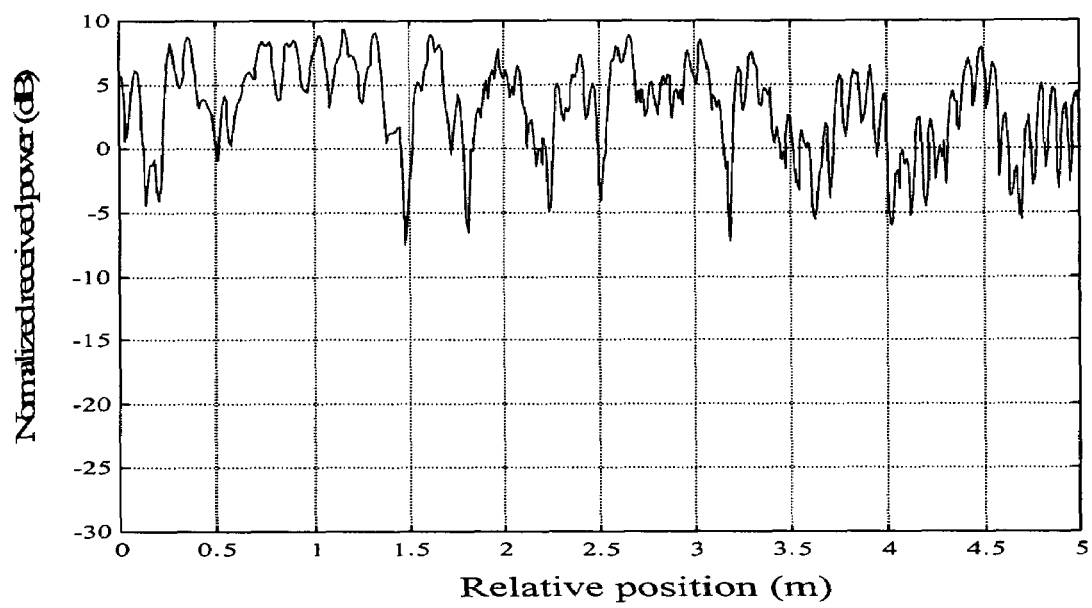

The concept described above applies frequency diversity at the transmitter by instantaneously selecting the best carrier for transmission. It is not necessary for the intended recipient's information itself to be repeatedly transmitted on different carriers; only the probes are repeated. In indoor environments, the Doppler spread is rather small and the time interval between probes can be rather long, adding only a small amount of overhead to the system. The performance is similar to an N-branch diversity scheme. This is depicted in FIGS. 13a, 13b, and 13c. In FIGS. 13a, 13b, and 13c, a scenario is assumed in which the location of the master 410 is fixed and the slave 412 moves along a straight line over several meters. An environment has been assumed where the coherence bandwidth is on the order of 10-15 MHz. FIG. 13a is a graph showing the normalized received power (in dB) at slave 412 as a function of its position for a first fixed frequency F1=2400 MHz. If the measurement is repeated under the same conditions but now at a second frequency F2=2420 MHz, a normalized received power as shown in FIG. 13b is observed. The scheme as proposed in this embodiment will always select the best frequency for communications. In FIG. 13c, the result of the selection diversity scheme is shown. This figure combines FIGS. 13a and 13b in that for each position, it takes the largest normalized receive power. Clearly, the deep fading dips (sometimes exceeding −25 dB as shown in FIG. 13b) have vanished and the variation is much smaller.

Although preferred embodiments of the method and system of the present invention have been illustrated in the accompanying figures and described in the foregoing Detailed Description, it will be understood that the invention is not limited to the embodiments disclosed, but is capable of numerous rearrangements, modifications and substitutions without departing from the spirit of the invention.

For example, the various embodiments described herein all involve sequentially transmitting probe messages to the slave. However, in alternative embodiments, mechanisms can be employed whereby groups of probe messages, or all probe messages, are transmitted in parallel (i.e., simultaneously). The fundamental technique of basing carrier frequency selection on response messages returned by a slave device remains the same.

Thus, the scope of the invention is set forth and defined by the following claims, rather than the preceding description, and all variations and equivalents which fall within the range of the claims are intended to be embraced therein.

What is claimed is:

1. A method of selecting a carrier frequency to be used to communicate information to a transceiver in a communication system, the method comprising:
   a) selecting a candidate carrier frequency from a set of one or more carrier frequencies;
   b) using the candidate carrier frequency to transmit a probe message to the transceiver;
   c) determining whether a corresponding response message has been received from the transceiver;
   d) until each of the one or more carrier frequencies has been selected as the candidate carrier frequency, selecting another carrier frequency from the set of one or more carrier frequencies for use as the candidate carrier frequency and repeating b) through d);
   e) using sequence of arrival of the response messages as a basis for selecting one of the candidate carrier frequencies for use as a selected carrier frequency for subsequently communicating information to the transceiver, wherein the selected carrier frequency is the candidate carrier frequency that corresponds to a last received one of the response messages.

2. The method of claim 1, wherein each of the corresponding response messages is received on a same carrier frequency as was used to transmit a corresponding one of the transmitted probe messages.

3. The method of claim 1, wherein information conveyed in each of the corresponding response messages includes an indication of reception quality of the corresponding probe message.

4. The method of claim 1, wherein each of the probe messages includes a training sequence.

5. The method of claim 4, wherein:
   each of the corresponding response messages includes a reception quality indicator; and
   the method includes using at least one of the one or more reception quality indicators to determine which of a plurality of modulation schemes to use when communicating information to the transceiver.

6. A method of selecting a carrier frequency to be used to communicate information to a transceiver in a communication system, the method comprising:
   a) selecting a first carrier frequency from a plurality of carrier frequencies;
   b) transmitting only a single probe message to the transceiver on the selected carrier frequency; and
   c) if a response message is received from the transceiver indicating that a reception quality of the probe message satisfied one or more predetermined criteria, then ceasing to send further probe messages and using the selected carrier frequency to communicate information to the transceiver, otherwise performing:
   d) selecting a different one of the carrier frequencies; and
   e) repeating b) through e) until a termination condition is met, the termination condition including detecting that the response message is received from the transceiver.

7. The method of claim 6, wherein a sequentially first one of the probe messages is transmitted on a best one of a number of candidate frequency carriers based on satisfaction of one or more predetermined criteria.

8. A method of selecting a carrier frequency to be used to communicate information with a transceiver in a communication system, the method comprising:
   a) selecting a candidate carrier frequency from a set of one or more carrier frequencies;
   b) determining whether a probe message has been received from the transceiver via the candidate carrier frequency;
   c) if a quality of reception of the probe satisfies one or more predetermined criteria and is better than a quality of reception of any earlier-received probe messages, then transmitting a response message to the transceiver;
   d) until each of the one or more carrier frequencies has been selected as the candidate carrier frequency, selecting another carrier frequency from the set of one or more carrier frequencies for use as the candidate carrier frequency and repeating b) through d);
   e) using sequence of transmission of the response messages as a basis for selecting one of the candidate carrier frequencies for use as a selected carrier frequency for subsequently communicating information with the transceiver, wherein the selected carrier frequency is the candidate carrier frequency that corresponds to a last transmitted one of the response messages.

9. The method of claim 8, comprising:
for each of the received probe messages, comparing a measure of reception quality of the received probe message with a threshold value to determine whether to transmit a corresponding response message.

10. The method of claim 8, wherein each of the one or more transmitted response messages is transmitted on a same carrier frequency as was used to receive a corresponding one of the transmitted probe messages.

11. The method of claim 8, wherein information conveyed in each of the two or more response messages includes an indication of reception quality of the corresponding probe message.

12. The method of claim 8, wherein each of the probe messages includes a training sequence.

13. The method of claim 12, comprising:
including a reception quality indicator in each of the one or more response messages,
wherein the one or more reception quality indicators can be used to determine which of a plurality of modulation schemes to use when communicating information with the transceiver.

14. A method of selecting a carrier frequency to be used to communicate information to a transceiver in a communication system, the method comprising:
a) selecting a first carrier frequency from a plurality of carrier frequencies;
b) detecting that a probe message was received from the transceiver on the selected carrier frequency;
c) if a quality of reception of the probe message is acceptable based on satisfaction of one or more predetermined criteria then transmitting a response message to the transceiver; and
d) if the quality of reception of the probe satisfies one or more predetermined criteria, then ceasing to select a different one of the carrier frequencies for use in detecting another probe message and using the selected carrier frequency to communicate information with the transceiver, otherwise performing:
e) selecting a different one of the carrier frequencies; and
f) repeating b) through f) until a termination condition is met, the termination condition including the quality of reception of the probe satisfying one or more predetermined criteria.

15. An apparatus for selecting a carrier frequency to be used to communicate information to a transceiver in a communication system, the apparatus comprising:
a) logic that selects a candidate carrier frequency from a set of one or more carrier frequencies;
b) logic that uses the candidate carrier frequency to transmit a probe message to the transceiver;
c) logic that determines whether a corresponding response message has been received from the transceiver;
d) logic that selects another carrier frequency from the set of one or more carrier frequencies for use as the candidate carrier frequency and repeatedly invokes b) through d) until each of the one or more carrier frequencies has been selected as the candidate carrier frequency;
e) logic that uses sequence of arrival of the response messages as a basis for selecting one of the candidate carrier frequencies for use as a selected carrier frequency for subsequently communicating information to the transceiver, wherein the selected carrier frequency is the candidate carrier frequency that corresponds to a last received one of the response messages.

16. The apparatus of claim 15, wherein each of the corresponding response messages is received on a same carrier frequency as was used to transmit a corresponding one of the transmitted probe messages.

17. The apparatus of claim 15, wherein information conveyed in each of the corresponding response messages includes an indication of reception quality of the corresponding probe message.

18. The apparatus of claim 15, wherein each of the probe messages includes a training sequence.

19. The apparatus of claim 18, wherein:
each of the corresponding response messages includes a reception quality indicator; and
the apparatus includes logic that uses at least one of the one or more reception quality indicators to determine which of a plurality of modulation schemes to use when communicating information to the transceiver.

20. An apparatus for selecting a carrier frequency to be used to communicate information to a transceiver in a communication system, the apparatus comprising:
a) logic that selects a first carrier frequency from a plurality of carrier frequencies;
b) logic that transmits only a single probe message to the transceiver on the selected carrier frequency; and
c) logic that ceases to send further probe messages and uses the selected carrier frequency to communicate information to the transceiver if a response message is received from the transceiver indicating that a reception quality of the probe message satisfied one or more predetermined criteria, and otherwise performs:
d) selecting a different one of the carrier frequencies; and
e) repeatedly invoking b) through e) until a termination condition is met, the termination condition including detecting that the response message is received from the transceiver.

21. The apparatus of claim 20, wherein a sequentially first one of the probe messages is transmitted on a best one of a number of candidate frequency carriers based on satisfaction of one or more predetermined criteria.

22. An apparatus for selecting a carrier frequency to be used to communicate information with a transceiver in a communication system, the apparatus comprising:
a) logic that selects a candidate carrier frequency from a set of one or more carrier frequencies;
b) logic that determines whether a probe message has been received from the transceiver via the candidate carrier frequency;
c) logic that transmits a response message to the transceiver if a quality of reception of the probe satisfies one or more predetermined criteria and is better than a quality of reception of any earlier-received probe messages;
d) logic that, until each of the one or more carrier frequencies has been selected as the candidate carrier frequency, selects another carrier frequency from the set of one or more carrier frequencies for use as the candidate carrier frequency and repeatedly invokes b) through d);
e) logic that uses sequence of transmission of the response messages as a basis for selecting one of the candidate carrier frequencies for use as a selected carrier frequency for subsequently communicating information with the transceiver, wherein the selected carrier frequency is the candidate carrier frequency that corresponds to a last transmitted one of the response messages.

23. The apparatus of claim 22, comprising:
logic that, for each of the received probe messages, compares a measure of reception quality of the received probe message with a threshold value to determine whether to transmit a corresponding response message.

24. The apparatus of claim 22, wherein each of the one or more transmitted response messages is transmitted on a same carrier frequency as was used to receive a corresponding one of the transmitted probe messages.

25. The apparatus of claim 22, wherein information conveyed in each of the two or more response messages includes an indication of reception quality of the corresponding probe message.

26. The apparatus of claim 22, wherein each of the probe messages includes a training sequence.

27. The apparatus of claim 26, comprising:
logic that includes a reception quality indicator in each of the one or more response messages,
wherein the one or more reception quality indicators can be used to determine which of a plurality of modulation schemes to use when communicating information with the transceiver.

28. An apparatus for selecting a carrier frequency to be used to communicate information with a transceiver in a communication system, the apparatus comprising:
a) logic that selects a first carrier frequency from a plurality of carrier frequencies;
b) logic that detects that a probe message was received from the transceiver on the selected carrier frequency;
c) logic that transmits a response message to the transceiver if a quality of reception of the probe message is acceptable based on satisfaction of one or more predetermined criteria; and
d) logic that ceases to select a different one of the carrier frequencies for use in detecting another probe message and uses the selected carrier frequency to communicate information with the transceiver if the quality of reception of the probe satisfied one or more predetermined criteria, and otherwise performs:
e) selecting a different one of the carrier frequencies; and
f) repeatedly invoking b) through f) until a termination condition is met, the termination condition including the quality of reception of the probe being satisfying one or more predetermined criteria.

29. A machine readable storage medium having stored therein a set of program instructions for causing a processor to select a carrier frequency to be used to communicate information to a transceiver in a communication system, the set of program instructions comprising instructions for causing the processor to perform:
a) selecting a candidate carrier frequency from a set of one or more carrier frequencies;
b) using the candidate carrier frequency to transmit a probe message to the transceiver;
c) determining whether a corresponding response message has been received from the transceiver;
d) until each of the one or more carrier frequencies has been selected as the candidate carrier frequency, selecting another carrier frequency from the set of one or more carrier frequencies for use as the candidate carrier frequency and repeating b) through d);
e) using sequence of arrival of the response messages as a basis for selecting one of the candidate carrier frequencies for use as a selected carrier frequency for subsequently communicating information to the transceiver, wherein the selected carrier frequency is the candidate carrier frequency that corresponds to a last received one of the response messages.

30. A machine readable storage medium having stored therein a set of program instructions for causing a processor to select a carrier frequency to be used to communicate information with a transceiver in a communication system, the set of program instructions comprising instructions for causing the processor to perform:
a) selecting a candidate carrier frequency from a set of one or more carrier frequencies;
b) determining whether a probe message has been received from the transceiver via the candidate carrier frequency;
c) if a quality of reception of the probe satisfies one or more predetermined criteria and is better than a quality of reception of any earlier-received probe messages, then transmitting a response message to the transceiver;
d) until each of the one or more carrier frequencies has been selected as the candidate carrier frequency, selecting another carrier frequency from the set of one or more carrier frequencies for use as the candidate carrier frequency and repeating b) through d);
e) using sequence of transmission of the response messages as a basis for selecting one of the candidate carrier frequencies for use as a selected carrier frequency for subsequently communicating information with the transceiver, wherein the selected carrier frequency is the candidate carrier frequency that corresponds to a last transmitted one of the response messages.

31. A machine readable storage medium having stored therein a set of program instructions for causing a processor to select a carrier frequency to be used to communicate information to a transceiver in a communication system, the set of program instructions comprising instructions for causing the processor to perform:
a) selecting a first carrier frequency from a plurality of carrier frequencies;
b) transmitting only a single probe message to the transceiver on the selected carrier frequency; and
c) if a response message is received from the transceiver indicating that a reception quality of the probe message satisfied one or more predetermined criteria, then ceasing to send further probe messages and using the selected carrier frequency to communicate information to the transceiver, otherwise performing:
d) selecting a different one of the carrier frequencies; and
e) repeating b) through e) until a termination condition is met, the termination condition including detecting that the response message is received from the transceiver.

32. A machine readable storage medium having stored therein a set of program instructions for causing a processor to select a carrier frequency to be used to communicate information to a transceiver in a communication system, the set of program instructions comprising instructions for causing the processor to perform:
a) selecting a first carrier frequency from a plurality of carrier frequencies;
b) detecting that a probe message was received from the transceiver on the selected carrier frequency;
c) if a quality of reception of the probe message is acceptable based on satisfaction of one or more predetermined criteria then transmitting a response message to the transceiver; and
d) if the quality of reception of the probe satisfies one or more predetermined criteria, then ceasing to select a different one of the carrier frequencies for use in detecting another probe message and using the selected carrier frequency to communicate information with the transceiver, otherwise performing;
e) selecting a different one of the carrier frequencies; and
f) repeating b) through f) until a termination condition is met, the termination condition including the quality of reception of the probe satisfying one or more predetermined criteria.

* * * * *